May 11, 1971     J. W. PALMER     3,578,394

PREPARATION OF AQUEOUS MANGANOUS CHLORIDE SOLUTIONS

Filed Dec. 5, 1969     3 Sheets-Sheet 2

EXAMPLES 6-9

DIGESTING SOLUTION B
FeCl$_2$    49.0 GRAMS
HCl    0.5 GRAMS
H$_2$O    q.s. 110.0 ML.

INVENTOR.
JAY W. PALMER
BY 3,578,394
PREPARATION OF AQUEOUS MANGANOUS CHLORIDE SOLUTIONS
Jay W. Palmer, Crystal Lake, Ill., assignor to Morton International, Inc., Chicago, Ill.
Filed Dec. 5, 1969, Ser. No. 882,558
Int. Cl. C01g 45/06
U.S. Cl. 23—87                                    15 Claims

ABSTRACT OF THE DISCLOSURE

A process for preparing aqueous solutions of manganous chloride essentially free from heavy metal contaminants by the reaction of manganese ore with an aqueous solution of ferrous chloride followed by removal of iron and heavy metals by treatment with sulfide ion. The manganous chloride solutions so prepared are suitable for further chemical processing or may be used to prepare pure manganese metal by electrolysis or other methods. Iron hydroxide may be recovered separately as a by-product of this process for use in pigments or as a raw material charge for the production of steel.

BACKGROUND OF THE INVENTION

Filed of the invention

Figure 1:
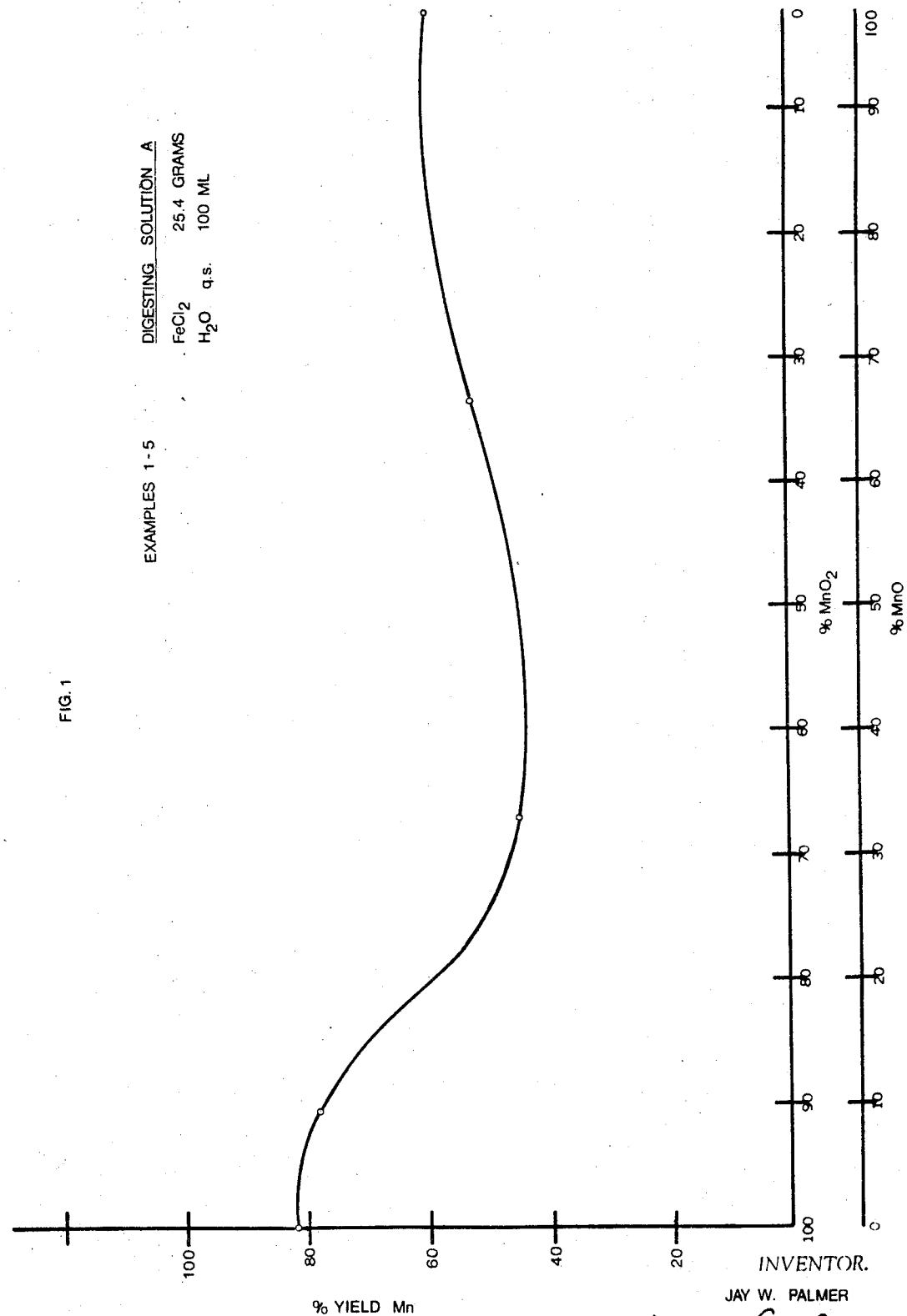

Manganese and its compounds are versatile and important materials having a multiplicity of uses in an industrial society. Manganous chloride finds use in dyeing, disinfecting, and as an intermediate in the preparation of a variety of other useful managanese compounds. It may also be used to prepare exceptionally pure manganese metal by electrolysis of its aqueous solutions. Manganese metal is essential to the steel industry since it is used in all steels for the purpose of countering the undesirable effects of sulfur and for imparting desirable metallurgical properties to the finished steel. It is also a valuable alloying element used in the preparation of numerous specialty metals.

Description of the prior art

One well-known commercial method for the preparation of manganous chloride comprises reacting reduced manganese ore with hydrochloric acid. Another process comprises dissolving manganese ore (pyrolusite) in concentrated hydrochloric acid with the concomitant evolution of chlorine gas according to the following equation:

$$MnO_2 + 4HCl \rightarrow MnCl_2 + Cl_2 + 2H_2O$$

Other methods react gaseous hydrogen chloride at elevated temperatures with a manganese ore to form and volatilize manganous chloride therefrom, or substitute chlorine for hydrogen chloride in the same reaction. Still other methods employ solid chloridizing agents such as calcium chloride, which when mixed with the ore and heated to about 1000° C., produces and volatilizes manganous chloride together with some iron chloride.

As is evident from a cursory examination of these industrial methods, they present inherent disadvantages: (1) the use of concentrated hydrochloric acid with the attendant evolution of chlorine gas poses handling, safety, and disposal problems which require adopting laborious and costly means to overcome and (2) the use of gaseous or solid reactants at high temperatures is expensive and requires specialized equipment to carry out the reaction and to separate the volatile products from each other.

It would therefore be desirable to provide a process for the preparation of an aqueous solution of manganous chloride essentially free from heavy metal contamination, which process overcomes the aforenoted disadvantages.

It is therefore an object of the present invention to provide a simplified process for the preparation of an aqueous solution of manganous chloride from manganese ore, which solution is essentially free from heavy metal contamination and which obviates the use of highly concentrated hydrochloric acid or the use of gaseous or solid reactants at high temperatures.

It is another object of this invention to provide a simplified process for the preparation of an aqueous solution of manganous chloride from manganese ore, which solution is essentially free from heavy metal contamination and which process utilizes as a reactant the industrial waste product, spent hydrochloric acid pickle liquor.

Another object of the present invention is the provision of a process for the preparation of an aqueous solution of manganous chloride essentially free from heavy metal contamination which process utilizes spent hydrochloric acid pickle liquor as a reactant and recovers therefrom iron hydroxide for conversion to iron oxide for use in pigments or as an iron-rich charge in the production of steel.

The fulfillment of these and other related objects of this invention may be more readily appreciated by reference to the following specification, examples, and appended claims.

SUMMARY OF THE INVENTION

Broadly, the process of the present invention provides an aqueous solution of manganese chloride essentially free from heavy metal contaminants by a process which comprises digesting (reacting) manganese ore containing heavy metal compounds with an aqueous solution of ferrous chloride, adding an alkaline compound to the digested mixture to bring the pH thereof to from about 4.5 to about 7.5 to form a neutralized mass containing iron hydroxide, adding a source of sulfide ion to the neutralized mass, and thereafter separating manganous chloride solution from said neutralized mass.

By "heavy metal contaminants" it is meant to include compounds of copper, cobalt, iron, lead, tin, cadmium, antimony, arsenic, mercury and nickel.

In this process one mole of ferrous chloride is required to react with one mole of manganese dioxide. In the event that free hydrochloric acid in dilute form is present in the pickle liquor digesting solution, a greater yield of manganous chloride is obtained by neutralizing the free acidity either before beginning the digestion or soon thereafter to adjust its pH to that of an aqueous solution of ferrous chloride, i.e., from about 2 to about 3 pH units. This may be accomplished conveniently by the addition of ammonium hydroxide or ammonia to the acid-containing ferrous chloride digesting solution. Although alkali metal hydroxides and carbonates may also be used for neutralization, they are undesirable in the instance where an appreciable concentration of alkali metal ion is to be avoided in the final manganous chloride solution.

Another suitable neutralizing agent which can be employed when required without also introducing an additional contaminant which must be removed is manganous oxide (MnO) which is a stronger base than manganese dioxide, the usual manganese component of manganese ores. One convenient method of obtaining manganous oxide is by the reduction of manganese ore. This may be accomplished by treating the ore, for example pyrolusite, with a hydrocarbonaceous oil at elevated temperatures. This reaction proceeds according to the following equation:

$$2MnO_2 + C \xrightarrow{700°\,C.} 2MnO + CO_2$$

Manganous oxide may also be formed in situ in a manganese ore containing $MnO_2$ by partially reducing the ore. Alternately, MnO may be prepared separately and introduced into the digestion solution with manganese ore either initially or shortly after the initiation of digestion. Manganese oxide, being a stronger base than manganese dioxide, reacts more readily with free hydrochloric acid than does $MnO_2$ with the two-fold benefit that (1) the digestion of the ore proceeds fairly rapidly and efficiently, and (2) no additional extraneous heavy metal component is introduced.

Any manganese ore containing manganese is a useful raw material in the process of the present invention although ores of the pyroeusite type are preferred. One useful ore is a pyrolusite type from the Congo known as Moanda ore which assays approximately 78% by weight $MnO_2$ (50% Mn). Another is a pyrolusite type which is obtained from Australia and assays approximately 85% by weight $MnO_2$ (55% Mn).

In the practice of the present process it is desirable that the particle size of the ore be reduced to a fineness that will pass a 30 mesh screen (U.S. Standard Sieve Series) to provide for better contact between the ore and the digesting solution. An ore particle size of about 100 mesh or finer is preferred. Any of the commercially available means for comminuting the ore may be employed.

As hereinbefore stated, an aqueous solution of ferrous chloride is the manganese ore-digesting solution employed in this invention. However, the expense of providing aqueous solutions of pure ferrous chloride militates against its use on a commercial scale in this process. One convenient, economical, and abundantly available commercial source of aqueous solutions of ferrous chloride is the industrial waste product known as "spent pickle liquor" (hydrochloric acid type). Spent pickle liquor is that waste solution which remains after steel is treated with either concentrated hydrochloric acid or with an aqueous solution of hydrochloric acid containing from about 20% to about 25% of hydrochloric acid for the purpose of cleaning the steel surface, removing mill scale, and otherwise preparing the metal surface for subsequent coating or plating operations. In industrial steel mill operations, hydrochloric acid pickle liquor is generally used until its HCl content is reduced to less than about 10% and it contains up to about 30% or more of ferrous chloride. The anti-pollution laws of most states prohibit dumping this objectionable pollutant into public waterways with the result that its disposal has been a problem and an expense to the steel industry for years. An added feature of the process of the present invention is that this waste spent pickle liquor is converted to a useful purpose in that its acid content is neutralized and its iron content is recovered without producing a further pollutant material for disposal. Spent hydrochloric acid pickle liquor is therefore a preferred digesting solution for use in the process of this invention, although it is understood that digesting solutions containing up to 45% or more of ferrous chloride are operable in this process.

Another useful digesting solution is that obtained by dissolving the complex salt which is crystallized from a thermal brine well liquor after the crystallization of sodium chloride therefrom. This complex salt contains as much as about 9 weight percent of ferrous chloride, in addition to varying quantities of sodium chloride, potassium chloride and manganese chloride.

The time of digestion of the manganese ore and the digesting solution is directly proportional to the temperature of digestion and the state of subdivision of the ore. The higher the temperature the shorter the time required for complete digestion. The maximum temperature (at ambient pressure) is reflux temperature, about 105° C. An ore having a small particle size will require less time for complete digestion than one of larger particle size. In general digestion is completed in about 2 to 5 hours at reflux temperature for an ore having a particle size smaller than about 30 mesh (U.S. Standard Sieve Series).

The alkaline compound used to adjust the pH of the digested mass may be selected from the group consisting of ammonium hydroxide, sodium hydroxide, potassium hydroxide, sodium carbonate, potassium carbonate, manganese carbonate, manganese hydroxide and calcium carbonate. It is preferred to use ammonium hydroxide since the by-product, ammonium chloride, is generally non-interferring in the subsequent electrolysis of manganese chloride.

The source of sulfide ion may be any sulfide which is capable of supplying sulfide ions, such as for example, an alkali metal sulfide, alkali metal polysulfide, ammonium sulfide or ammonium polysulfide, and hydrogen sulfide.

One useful by-product of this invention is iron hydroxide which can be filtered from the neutralized digestion mixture after the pH has been adjusted and prior to the addition of sulfide to precipitate heavy metals such as copper, cobalt, and nickel. The iron hydroxide precipitate obtained in this process filters readily and may be used as a component of a variety of pigments. If desired, the iron hydroxide may be calcined to provide ferric oxide, itself useful as a pigment ingredient or an iron-rich blast furnace charge in the production of steel.

In one preferred form, a spent pickle liquor containing up to about 20% by weight of ferrous chloride and up to about 10% by weight of hydrochloric acid is neutralized with ammonium hydroxide to a pH of from about 2 to 3. Finely divided manganese ore is digested in the neutralized pickle liquor at reflux temperature for about 3 hours. The quantity of ferrous chloride used is, on a molar basis, at least about equal to the manganese content of the ore. The digested mass is neutralized with ammonium hydroxide to a pH of from about 5.5 to about 7 and filtered to separate iron hydroxide therefrom. Ammonium sulfide in excess of the heavy metal content of the ore is added to the filtrate to precipitate heavy metal sulfides, after which the mass is filtered to provide an aqueous solution of manganous chloride essentially free from heavy metal contaminants.

In another preferred form, the following process is carried out:

(1) Manganese ore is comminuted to a particle size finer than 30 mesh (U.S. Standard Sieve Series).

(2) The finely divided ore is digested with spent hydrochloric acid pickle liquor containing from about 15 to about 35 weight percent of ferrous chloride, and up to about 5% of hydrochloric acid. The digestion is carried out at reflux temperature for a period of up to about 3 hours.

(3) Manganese ore which has been reduced to MnO as hereinbefore described is added to the digested mixture. The digestion is continued for an additional period of time, up to about 3 hours. The quantity of ferrous chloride used is, on a molar basis, at least about equal to the total manganese content present.

(4) After digestion, ammonium hydroxide is added to the hot admixture to obtain a pH of from about 6 to about 7. At this point, the mass may be filtered to remove ferric hydroxide which can be used either as a pigment or as a high grade source of iron in a steel-making process.

(5) Ammonium sulfide is added, either to the filtrate from Step 4 if ferric hydroxide had been removed or to the entire admixture if not, and the mass is digested for an additional half hour.

(6) The admixture is filtered to yield an aqueous solution of manganous chloride essentially free of heavy metal contaminants.

For a more complete understanding of the present invention, reference is now made to the following specific examples illustrating the novel process of the present invention.

DESCRIPTION OF THE PREFERRED EMBODIMENTS

Example 1

Moanda ore, a manganese ore assaying 78% $MnO_2$ (50% Mn) was ground to a particle size finer than 100 mesh (U.S. Standard Sieve Series). Eleven and one-half grams of the finely divided ore were added to 100 ml.

of an aqueous digesting solution containing 25.4 grams of ferrous chloride (0.2 mole) and having a pH of 2.2 (Digesting Solution A). This admixture was digested for three hours at reflux temperature (105° C.) and then neutralized while hot with 39 ml. of 4 N $NH_4OH$ to a pH of 6.4. To the neutralized mixture were added 5 ml. of an aqueous 20% $(NH_4)_2S$ solution (providing excess sulfide ion). The mass was filtered while hot and washed with water to remove iron hydroxide and heavy metal sulfides. The filtrate was diluted to a volume of 250 ml. and a portion was analyzed for manganese, iron, copper, cobalt, and calcium and magnesium content.

Analysis—
  Mn—4.75 g.
  Fe—3.1 parts per million
  Cu—0.05 p.p.m.
  Co—Less than 0.1 p.p.m.[1]
  Ca and Mg combined—0.024 g.

$$\text{Yield of Mn} = \frac{4.75 \times 100}{11.5 \times 0.5} = 82.6\%$$

[1] None detected—sensitivity of method is 0.1 p.p.m.

Example 2

Reduced ore (9.8 g.) of which the manganese content was essentially entirely present as MnO, was prepared from 11.5 g. of Moanda ore by reduction thereof with a petroleum oil at a temperature of 800° C. This reduced ore was digested according to the procedure of Example 1. The hot digested mixture was treated with 5 ml. 4 N $NH_4OH$ to a resultant pH of 6.1 and then with 5 ml. of 20% $(NH_4)_2S$ solution. The mass was filtered and the filtrate was diluted to a volume of 250 ml. and analyzed for Mn content.

Analysis—3.45 g. Mn $$\text{Yield} = \frac{3.45 \times 100}{11.5 \times 0.5} = 60.0\%$$

Example 3

Moanda ore (4.0 g.) and 7.0 g. reduced ore (obtained by reducing 8.2 g. Moanda ore according to the procedure described in Example 2) were digested according to the procedure described in Example 1. The hot digested mixture was treated with 15 ml. 4 N $NH_4OH$ to a resultant pH of 6.2 and then with 5 ml. 20% $(NH_4)_2S$ solution. The mass was filtered and the filtrate was diluted to a volume of 250 ml. and analyzed for Mn content.

Analysis—3.23 g. Mn $$\text{Yield} = \frac{3.23 \times 100}{(4.0 \times 0.5) + (8.2 \times 0.5)} = 53.4\%$$

Example 4

Moanda ore (7.6 g.) and 3.2 g. reduced ore (obtained by reducing 3.8 g. Moanda ore according to the procedure described in Example 2) were digested according to the procedure described in Example 1. The hot digested mixture was treated with 20 ml. 4 N $NH_4OH$ to a resultant pH of 6.2 and then with 5 ml. 20% $(NH_4)_2S$ solution. The mass was filtered and the filtrate was diluted to a volume of 250 ml. and analyzed for Mn content.

Analysis—2.6 g. Mn $$\text{Yield} = \frac{2.6 \times 100}{(7.6 \times 0.5) + (3.8 \times 0.5)} = 45.6\%$$

Example 5

Moanda ore (10.0 g.) and 0.85 g. reduced ore (obtained by reducing one gram Moanda ore according to the procedure described in Example 2) were digested according to the procedure described in Example 1. The hot digested mixture was treated with 37 ml. of 4 N $NH_4OH$ to a resultant pH of 6.2 and then with 2 ml. of 20% $(NH_4)_2S$ solution. The mass was filtered and the filtrate was diluted to volume of 250 ml. and analyzed for Mn content.

Analysis—4.38 g. Mn $$\text{Yield} = \frac{4.38 \times 100}{(10 \times 0.5) + (1.0 \times 0.5)} = 79.6\%$$

The data and results of Examples 1–5 are summarized in Table 1.

TABLE 1
[Digesting solution A]

| Example | 1 | 2 | 3 | 4 | 5 |
|---|---|---|---|---|---|
| Grams $MnO_2$ (Moanda) | 11.5 | 0 | 4.0 | 7.6 | 10.0 |
| Grams Mn from $MnO_2$ | 5.75 | 0 | 2.0 | 3.8 | 5.0 |
| Grams MnO ore (reduced ore) | 0 | 9.8 | 7.0 | 3.2 | 0.85 |
| Grams Mn from MnO ore | 0 | 5.75 | 4.1 | 1.9 | 0.5 |
| Total Mn available | 5.75 | 5.75 | 6.1 | 5.7 | 5.5 |
| Percent Mn from MnO | 0 | 100 | 67.2 | 33.3 | 9.0 |
| Mn recovered | 4.75 | 3.45 | 3.23 | 2.6 | 4.38 |
| Yield, percent | 82.6 | 60.0 | 53.4 | 45.6 | 79.6 |
| Ml. 4 N $NH_4OH$ | 39 | 5 | 15 | 20 | 37 |
| pH | 6.4 | 6.1 | 6.2 | 6.2 | 6.2 |

Examples 1 through 5 illustrate that in the process of the present invention the use of a ferrous chloride digesting solution containing no free hydrochloric acid provides optimum yields of manganese chloride when the manganese-containing ore employed is one in which manganese is present primarily in the manganese dioxide state. Although the process is operable for a manganese ore consisting principally of manganous oxide, the use of such ore with this type digesting solution reduces the overall efficiency of the method.

This is depicted graphically in FIG. 1 where the percent yield of manganese obtained in Examples 1–5 is plotted along the ordinate and the respective percentages of $MnO_2$ and MnO present in the ore are plotted along the abscissa.

Example 6

Moanda ore (25.0 g.) having a particle size finer than 30 mesh (U.S. Standard Sieve Series) was added to 110 ml. of a spent hydrochloric acid pickle liquor digesting solution containing 49 g. of ferrous chloride (0.39 mole) and 1.3 g. concentrated hydrochloric acid (0.5 g. HCl basis).

This solution is designated Digesting Solution B. This admixture was digested for 7 hours at reflux temperatures (105° C.) and then neutralized with 120 ml. of 4 N $NH_4OH$ to a resultant pH of 6.0. To the neutralized mixture were added 5 ml. of 20% $(NH_4)_2S$ solution and the digestion was continued for an additional 30 minutes. The mass was filtered and washed with water to remove iron hydroxide and heavy metal sulfides. The filtrate was diluted to a volume of 250 ml. and analyzed for manganese, iron, copper, cobalt, and calcium and magnesium content.

Analysis—
  Mn—7.38 g.
  Fe—0.41 p.p.m.
  Cu—0.13 p.p.m.
  Co—0.0 p.p.m.
  Ca and Mg combined—0.08 g.

$$\text{Yield of Mn} = \frac{7.38 \times 100}{25.0 \times 0.5} = 59.0\%$$

Example 7

Moanda ore (16.7 g.) and 7.1 g. reduced or (obtained by reducing 8.3 g. Moanda ore according to the procedure of Example 2) were digested according to the procedure described in Example 6. To the digested mass were added 42 ml. 4 N $NH_4OH$ to a resultant pH of 6.2, followed by 5 ml. $(NH_4)_2S$ solution. The mixture was digested for an additional 30 minutes and then filtered and washed with water. The filtrate was diluted to a volume of 250 ml. and analyzed for manganese content.

Analysis—10.6 g. Mn $$\text{Yield} = \frac{10.6 \times 100}{(16.7 \times 0.5) + (8.3 \times 0.5)} = 84.8\%$$

Example 8

Twenty-five grams Moanda ore were reduced according to the procedure of Example 2 to yield 21.5 g. reduced ore. The reduced ore was digested according to the procedure described in Example 6. To the digested mass were added 48 ml. 4 N $NH_4OH$ to a resultant pH of 6.2, followed by 5 ml. 20% $(NH_4)_2S$ solution. The mixture was filtered and washed with water to remove iron hydroxide and heavy metal sulfides. The filtrate was diluted to a volume of 250 ml. and analyzed for manganese content.

Analysis—9.0 g. Mn $$\text{Yield} = \frac{9.0 \times 100}{(25 \times 0.5)} = 72.0\%$$

Example 9

Moanda ore (22.5 g.) and 2.2 g. reduced ore (obtained by reducing 2.5 g. Moanda ore according to the procedure of Example 2) were digested according to the procedure described in Example 6. To the digested mass were added 79 ml. of 4 N $NH_4OH$ to a resultant pH of 6.2, followed by 5 ml. of 20% $(NH_4)_2S$ solution. The mixture was digested for an additional 30 minutes and then filtered and washed with water. The filtrate was diluted to a volume of 250 ml. and analyzed for Mn content.

Analysis—8.43 g. Mn $$\text{Yield} = \frac{8.43 \times 100}{(22.5 \times 0.5) + (2.5 \times 0.5)} = 67.5\%$$

The data and results of Examples 6–9 are summarized in Table 2.

TABLE 2

[Digesting solution B]

| Example | 6 | 7 | 8 | 9 |
| --- | --- | --- | --- | --- |
| Grams $MnO_2$ ore (Moanda) | 25 | 16.7 | 0 | 22.5 |
| Grams Mn from $MnO_2$ | 12.5 | 8.35 | 0 | 11.25 |
| Grams MnO ore (reduced ore) | 0 | 7.1 | 21.5 | 2.2 |
| Grams Mn from MnO | 0 | 4.15 | 12.5 | 1.25 |
| Total Mn | 12.5 | 12.5 | 12.5 | 12.5 |
| Percent Mn from MnO | 0 | 33.3 | 100 | 10 |
| Mn recovered | 7.38 | 10.6 | 9.0 | 8.43 |
| Yield, percent | 59.0 | 84.8 | 72.0 | 67.5 |
| Ml. 4 N $NH_4OH$ | 120 | 42 | 48 | 79 |
| pH | 6.0 | 6.2 | 6.2 | 6.2 |

Examples 6 through 9 illustrate that in the instance where the ferrous chloride digesting solution contains approximately 0.5% by weight of free HCl, then the yield of manganese chloride is increased by the addition of reduced manganese ore (manganous oxide) to the manganese ore, or even by the exclusive use of manganous oxide ore.

Figure 2:
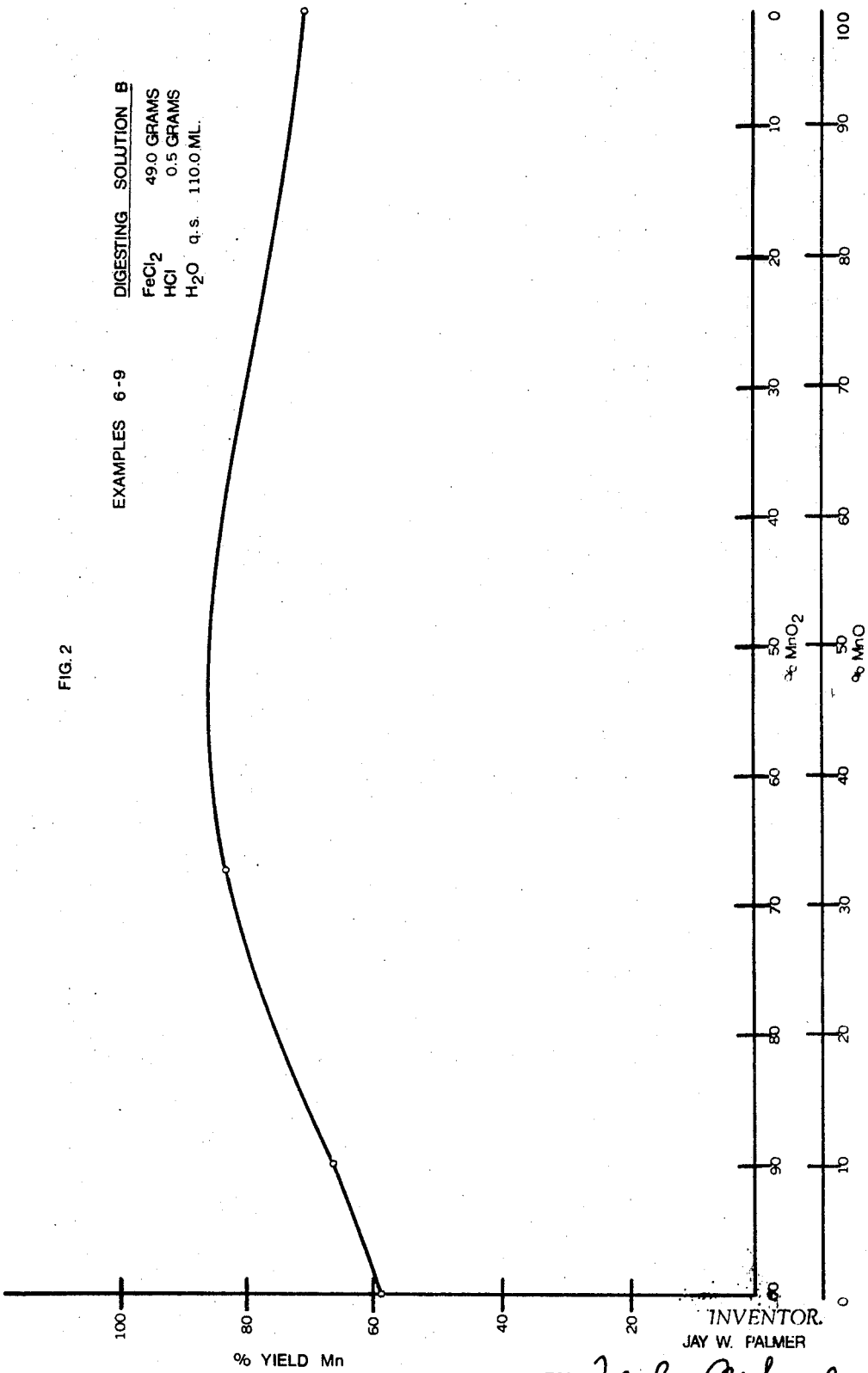

This is depicted graphically in FIG. 2 where the percent yield of manganese obtained in Examples 6–9 is plotted along the ordinate and the respective percentages of $MMnO_2$ and MnO present in the ore are plotted along the abscissa.

Example 10

Thirty-one grams of Moanda ore having a particle size finer than 100 Mesh (U.S. Standard Sieve Series) were added to 115 ml. of a digestion solution (Digesting Solution C) containing 40.0 grams of $FeCl_2 \cdot 4H_2O$ (25.5 g. $FeCl_2$—0.2 mole) and 15 ml. of concentrated hydrochloric acid (6.4 g. HCl basis). This mixture was digested for 3 hours at reflux temperature (105° C.) and then neutralized with 95 ml. of 4 N $NH_4OH$ to a resultant pH of 6.2. To the neutralized mixture was added 5 ml. of 20% $(NH_4)_2S$ and digestion at 80–90° C. was continued for 30 minutes. The mass was filtered and washed with water to remove iron hydroxide and heavy metal sulfides. The filtrate was diluted to a volume of 250 ml. and analyzed for manganese content.

Analysis—6.4 g. Mn $$\text{Yield} = \frac{6.4 \times 100}{31.0 \times 0.5} = 41.2\%$$

EXAMPLE 11

Moanda ore (24.8 g.) and 5.3 g. of reduced ore (prepared by reducing 6.2 g. of Moanda ore by the procedure of Example 2) were digested according to the procedure of Example 10. The hot digested mixture was treated with 79 ml. of 4 N $NH_4OH$ to a resultant pH of 6.4 followed by the addition of 5 ml. of 20% $(NH_4)_2S$ solution and further digestion at 80–90° C. for an additional 30 minutes. The mass was filtered and washed with water to remove iron hydroxide and heavy metal sulfides. The filtrate was diluted to 250 ml. and analyzed for Mn content.

Analysis—7.6 g. Mn $$\text{Yield} = \frac{7.6 \times 100}{(24.8 \times 0.5) + (6.2 \times 0.5)} = 49.0\%$$

EXAMPLE 12

Moanda ore (20.7 g.) and 8.8 g. of reduced ore (obtained by reducing 10.3 g. of Moanda ore by the procedure of Example 2) were digested according to the procedure of Example 10. The hot digested mixture was neutralized with 65 ml. of 4 N $NH_4OH$ to a resultant pH of 6.5 followed by the addition of 5 ml. of 20% $(NH_4)_2S$ and further digestion at 80–90° C. for an additional 30 minutes. The mass was filtered and washed to remove iron hydroxide and heavy metal sulfides. The filtrate was diluted to a volume of 250 ml. and analyzed for Mn content.

Analysis—8.25 g. Mn $$\text{Yield} = \frac{8.25 \times 100}{(20.7 \times 0.5) + (10.3 \times 0.5)} = 53.2\%$$

EXAMPLE 13

Fifteen grams of Moanda ore and 13.5 g. reduced ore (obtained by reducing 16.0 g. Moanda ore by the procedure of Example 2) were digested according to the procedure of Example 10. The hot digestion mixture was treated with 35 ml. of 4 N $NH_4OH$ to a resultant pH of 6.7 followed by the addition of 5 ml. of 20% $(NH_4)_2S$ and further digestion at 80–90° C. for an additional 30 minutes. The mass was filtered and washed with water to remove iron hydroxide and heavy metal sulfides. The filtrate was diluted to a volume of 250 ml. and analyzed for Mn content.

Analysis—10.75 g. Mn $$\text{Yield} = \frac{10.75 \times 100}{(15.0 \times 0.5) + (16.0 \times 0.5)} = 69.5\%$$

EXAMPLE 14

Eleven grams of Moanda ore were digested according to the procedure of Example 10 for one-half hour, after which time 17.0 g. of reduced ore (obtained by reducing 20 g. Moanda ore by the procedure of Example 2) were added to the digesting solution and the digestion was continued for an additional two and one-half hours. The hot digested mixture was then treated with 35 ml. of 4 N $NH_4OH$ to a resultant pH of 6.6 followed by the addition of 5 ml. of 20% $(NH_4)_2S$ and further digestion at 80–90° C. for an additional 30 minutes. The mass was filtered and washed with water to remove iron hydroxide and heavy metal sulfides. The filtrate was diluted to a volume of 250 ml. and analyzed for Mn content.

Analysis—10.0 g. Mn $$\text{Yield} = \frac{10.0 \times 100}{(11.0 \times 0.5) + (20.0 \times 0.5)} = 64.5\%$$

EXAMPLE 15

The procedure of Example 13 was followed except that the reduced ore was added together with the Moanda ore and 42 ml. of 4 N NH$_4$OH were added to a resultant pH of 7.1.

Analysis—10.95 g. Mn $$\text{Yield} - \frac{10.95 \times 100}{(11.0 \times 0.5) + (20.0 \times 0.5)} = 70.6\%$$

EXAMPLE 16

Moanda ore (5.5 g.) and 21.5 g. of reduced ore (obtained by reducing 25.5 g. of Moanda ore) were digested according to the procedure of Example 10. The hot digestion mixture was treated with 20 ml. of 4 N NH$_4$OH to a resultant pH of 6.4 followed by the addition of 5 ml. of 20% (NH$_4$)$_2$S and further digestion at 80–90° C. for an additional 30 minutes. The mass was filtered and washed with water to remove iron hydroxide and heavy metal sulfides. The filtrate was diluted to a volume of 250 ml. and analyzed for Mn content.

Analysis—10.6 g. Mn $$\text{Yield} - \frac{10.6 \times 100}{(5.5 \times 0.5) + (25.5 \times 0.5)} = 68.4\%$$

EXAMPLE 17

Three grams of Moanda ore and 24.0 g. reduced ore (obtained by reducing 28.0 g. Moanda ore by the procedure of Example 2) were digested according to the procedure of Example 10. The hot digestion mixture was treated with 15 ml. of 4 N NH$_4$OH to a resultant pH of 6.2 followed by the addition of 5 ml. of 20% (NH$_4$)$_2$S and further digestion at 80–90° C. for an additional 30 minutes. The mass was filtered and washed with water to remove iron hydroxide and heavy metal sulfides. The filtrate was diluted to 250 ml. and analyzed for Mn content.

Analysis—9.9 g. Mn $$\text{Yield} - \frac{9.9 \times 100}{(3.0 \times 0.5) + (28.0 \times 0.5)} = 63.8\%$$

EXAMPLE 18

Twenty-seven grams of reduced ore, obtained by reducing 31.0 g. of Moanda ore by the procedure of Example 2, were digested according to the procedure of Example 10. The hot digestion mixture was treated with 25 ml. of 4 N NH$_4$OH to a resultant pH of 6.3 followed by the addition of 5 ml. of 20% (NH$_4$)$_2$S and further digestion at 80–90° C. for an additional 30 minutes. The mass was filtered and washed with water to remove iron hydroxide and heavy metal sulfides. The filtrate was diluted to a volume of 250 ml. and analyzed for Mn content.

Analysis—9.75 g. Mn $$\text{Yield} - \frac{9.75 \times 100}{31.0 \times 0.5} = 62.9\%$$

EXAMPLE 19

Eleven grams of Moanda ore were digested according to the procedure of Example 10 for one-half hour, after which time 16.1 g. of reduced ore (obtained by reducing 20 g. Moanda ore by the procedure of Example 2) were added to the digesting solution and the digestion was continued for an additional two and one-half hours. The hot digested mixture was then treated with 45 ml. of 4 N NH$_4$OH to a resultant pH of 6.8 followed by the addition of 5 ml. of 20% (NH$_4$)$_2$S and further digestion at 80–90° C. for an additional 30 minutes. The mass was filtered and washed with water to remove iron hydroxide and heavy metal sulfides. The filtrate was diluted to a volume of 250 ml. and analyzed for manganese, iron, cobalt, copper, calcium and magnesium content.

Analysis—
  Mn—10.25 g.
  Fe—0.2 p.p.m.
  Cu—0.02 p.p.m.
  Co—2.1 p.p.m.
  Ca and Mg combined 0.06 g.

$$\text{Yield of Mn} - \frac{10.25 \times 100}{(11.0 \times 0.5) + (20 \times 0.5)} = 66.1\%$$

The data and results of Examples 10–19 are summarized in Table 3.

Figure 3:
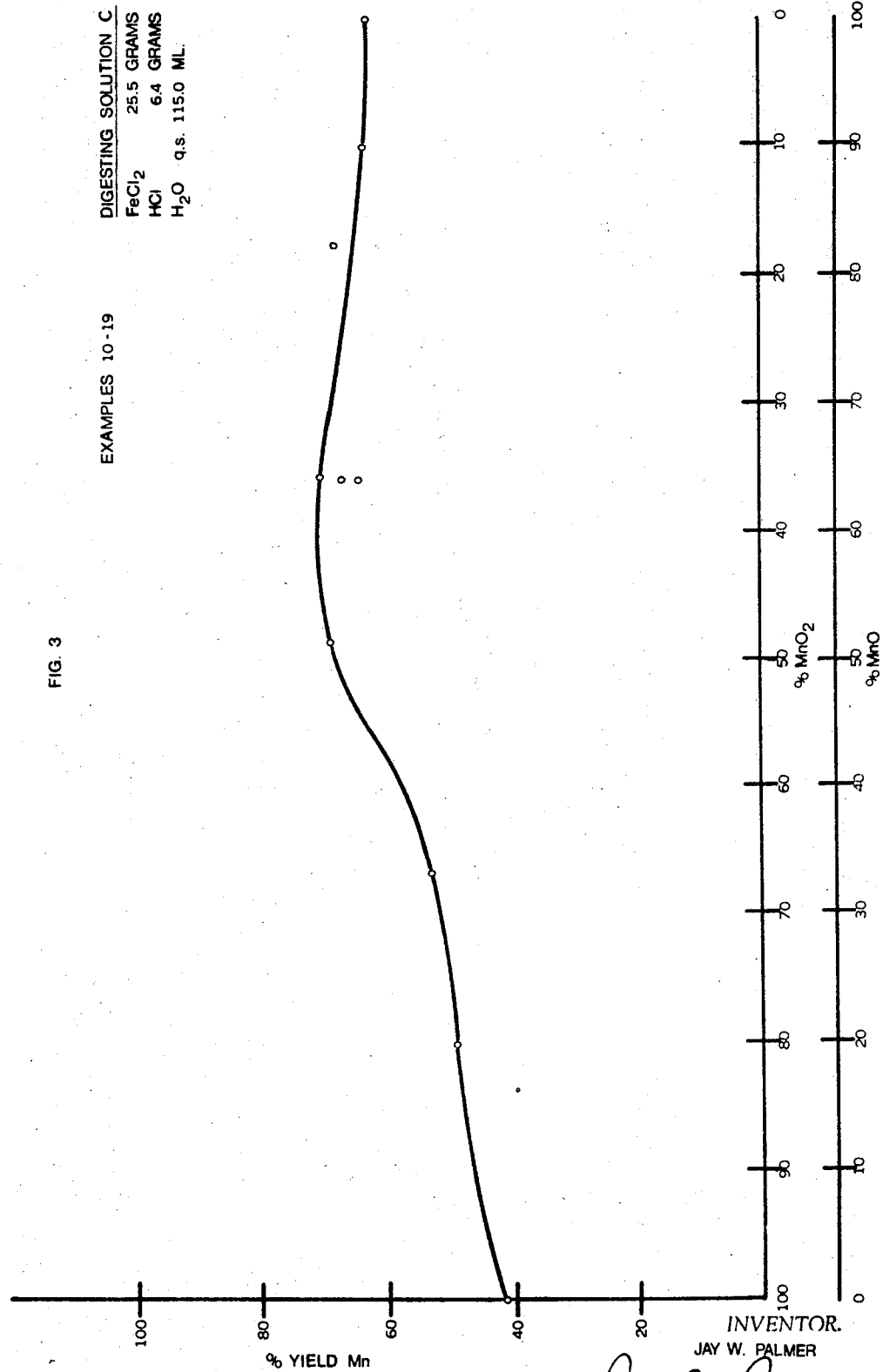

Examples 10 through 19 illustrate that in the instance where the ferrous chloride digesting solution contains approximately 5% by weight of free HCl, the yield of manganese is increased by the addition of reduced manganese ore (manganous oxide) to the manganese ore, or even by the exclusive use of manganous ore. This is depicted graphically in FIG. 3 where the percent yield of manganese obtained in Examples 10–19 is plotted along the ordinate and the respective percentages of MnO$_2$ and MnO are plotted long the abscissa.

Example 20

The digesting solution (Digesting Solution C) used in Examples 10–19 was adjusted to a pH of 2.2 (i.e. one containing no free acid) by adding ammonium hydroxide to 115 ml. of this solution. Eleven grams of Moanda ore were added to 115 ml. of this neutralized digestion solution and digested for three hours at reflux temperature (105° C.) and the neutralized with 45 ml. of 4 N NH$_4$OH to a resultant pH of 6.5. To the neutralized mixture 2 ml. of 20% (NH$_4$)$_2$S solution were added and digestion was continued at 80–90° C. for 30 minutes. The mass was TABLE 3
[Digesting solution C]

| Example | 10 | 11 | 12 | 13 | 14 | 15 | 16 | 17 | 18 | 19 |
|---|---|---|---|---|---|---|---|---|---|---|
| Grams MnO$_2$ ore (Moanda) | 31.0 | 24.8 | 20.7 | 15.0 | 11.0 | 11.0 | 5.5 | 3.0 | 0 | 11.0 |
| Grams Mn from MnO$_2$ | 15.5 | 12.4 | 10.35 | 7.5 | 5.5 | 5.5 | 2.75 | 1.59 | 0 | 5.5 |
| Grams MnO ore (reduced ore) | 0 | 5.3 | 8.8 | 13.5 | 17.0 | 17.0 | 21.5 | 24 | 27.0 | 16.1 |
| Grams Mn from MnO ore | 0 | 3.1 | 5.15 | 8.0 | 10.0 | 10.0 | 12.75 | 14.0 | 15.5 | 10.0 |
| Total Mn | 15.5 | 15.5 | 15.5 | 15.5 | 15.5 | 15.5 | 15.5 | 15.5 | 15.5 | 15.5 |
| Mn recovered | 6.4 | 7.6 | 8.25 | 10.75 | 10.0 | 10.95 | 10.6 | 9.9 | 9.75 | 10.25 |
| Yield, percent | 41.2 | 49.0 | 53.2 | 69.5 | 64.5 | 70.6 | 68.4 | 63.8 | 62.9 | 66.1 |
| Ml. 4 N NH$_4$OH | 95 | 79 | 65 | 35 | 35 | 42 | 20 | 15 | 25 | 45 |
| pH | 6.2 | 6.4 | 6.5 | 6.7 | 6.6 | 7.1 | 6.4 | 6.2 | 6.3 | 6.8 |
| Percent Mn from MnO | 0 | 20 | 33.3 | 51.6 | 64.5 | 64.5 | 82.3 | 90.3 | 100 | 64.5 | filtered and wasned to remove iron hydroxide and heavy metal sulfides. The filtrate was diluted to a volume of 250 ml. and analyzed for manganese content.

Analysis—4.45 g. Mn $$\text{Yield} - \frac{4.45 \times 100}{11.0 \times 0.5} = 80.8\%$$

Comparing the Mn yield of Example 20 with that of Example 10, it is seen that when the free hydrochloric acid of the digesting solution is neutralized and then used in the process of this invention an increased yield of manganese chloride is obtained. Comparing the yield of Example 20 with those of Examples 13–16, it is noted that the use of a neutralized digesting solution provides a greater yield of manganese chloride than even that obtained by the use of reduced ore.

Example 21

Thirty-one grams of Moanda ore (containing 3.0% Fe) were added to 115 ml. of a digesting solution containing 24.5 grams of FeCl$_2$ and 15 ml. of concentrated hydrochloric acid (6.4 g. HCl basis). This admixture was digested for 3 hours at reflux temperature and then neutralized with 45 ml. of 4 N NH$_4$OH to a pH of 6.8. The resulting precipitate was filtered, washed, and dried to constant weight at 110° C. The dried precipitate weighed 31.5 grams and assayed 38.35% iron as Fe, equivalent to 73.4% of iron hydroxide as Fe(OH)$_3$, and 12.0 grams of iron as Fe. This is virtually 100% recovery of iron as seen from the following calculation:

|  | Gm. |
|---|---|
| Fe from 31 g. Moanda ore | 0.9 |
| Fe from 24.5 g. FeCl$_2$ | 10.9 |
| Total Fe available | 11.8 |
| Total Fe recovered | 12.0 |

To the filtrate from the separation of iron hydroxide were added 5 ml. of 20% (NH$_4$)$_2$S solution to precipitate heavy metal sulfides and digestion was contained for about 30 minutes. The mass was filtered and washed with water to remove heavy metal sulfides. The filtrate was analyzed for manganese, iron, copper, cobalt, and calcium and magnesium content.

Analysis—
  Mn—10.25 g.
  Fe—0.2 p.p.m.
  Cu—0.02 p.p.m.
  Co—2.1 p.p.m.
  Ca and Mg combined—0.06 g.

$$\text{Yield} = \frac{10.25 \times 100}{31 \times 0.50} = 66.1\% \text{ Mn}$$

This example demonstrates the efficiency of the present process in recovering the iron content of the digesting solution in addition to the manganese content of the ore.

Example 22

Five grams of Moanda ore were added to 150 ml. of a digesting solution containing 67 grams of a complex salt crystallized from thermal brine well liquor after crystallization of sodium chloride therefrom. This complex salt analyzed 14.2% NaCl, 47.8% KCl, 3.9% CaCl$_2$, 9.3% FeCl$_2$, and 17.9% MnCl$_2$. This admixture was digested for three hours at reflux temperature and then neutralized with 6 ml. of 4 N NH$_4$OH to a pH of 6.7. To the neutralized mixture 5 ml. of 20% (NH$_4$)$_2$S solution were added and digestion was continued at 80–90° C. for 30 minutes. The mass was filtered and washed with water to remove iron and heavy metal sulfides. The filtrate was diluted to a volume of 250 ml. and analyzed for manganese, iron, copper, cobalt, and calcium and magnesium content.

Analysis—
  Mn—6.50 g.
  Fe—0.025 p.p.m.
  Co—0.8 p.p.m.
  Cu—0.16 p.p.m.
  Ca and Mg combined—1.25 g.

$$\text{Yield} = \frac{6.50 \times 100}{(67 \times 0.179 \times 0.436) + (5 \times 0.5.)} = 84.0\%$$

As is seen, the solution obtained in Example 23 is essentially free from heavy metal contaminants. However, it still contains substantial amounts of potassium and sodium chloride. If desired, manganese hydroxide can be separated from these constituents by precipitation with ammonium hydroxide. Manganese hydroxide may be further processed by conventional methods to form other manganese compounds or manganese metal.

What is claimed is:

1. A process for producing an aqueous solution of manganous chloride essentially free from heavy metal contaminants, comprising:

(I) digesting a manganese ore containing heavy metal compounds with an aqueous solution of ferrous chloride to form a digested mixture, the quantity of ferrous chloride on a molar basis being at least about equal to the manganese content of the ore,
  (II) adjusting the pH of the digested mixture to from about 4.5 to about 7.5 to form a neutralized mass containing iron hydroxide;
  (III) adding a source of sulfide ion to the neutralized mass to precipitate essentially all of said heavy metal compounds as sulfides and
  (IV) separating an aqueous solution of manganous chloride from said neutralized mass.

2. The process of claim 1 wherein the manganese ore comprises an admixture of manganese oxides in the manganese dioxide and manganous oxide states.

3. The process of claim 2 wherein the aqueous solution of ferrous chloride contains up to about 10% by weight of hydrochloric acid on an HCl basis.

4. The process of claim 1 wherein iron hydroxide is separated from the neutralized mass prior to the addition of sulfide ion thereto.

5. A process for providing an aqueous solution of manganous chloride essentially free from heavy metal contaminants, comprising:

(I) digesting a manganese ore containing heavy metal compounds with an aqueous solution containing ferrous chloride to form a digested mixture, the quantity of ferrous chloride on a molar basis being at least about equal to the manganese content of the ore,
  (II) adding an alkaline compound selected from the group consisting of ammonium hydroxide, sodium hydroxide, potassium hydroxide, sodium carbonate, potassium carbonate, manganese carbonate, manganese hydroxide and calcium carbonate to the digested mixture to bring the pH thereof to from about 4.5 to about 7.5 to form a neutralized mass containing iron hydroxide;
  (III) adding a source of sulfide ion selected from the group consisting of alkali metal sulfides, alkali metal polysulfides, ammonium sulfide, ammonium polysulfide, and hydrogen sulfide to said neutralized mass in an amount on a molar basis at least about equal to the heavy metal content of said manganese ore to precipitate essentially all of the heavy metal content as sulfides; and
  (IV) separating manganous chloride from the solids in said neutralized mass.

6. The process of claim 5 wherein the alkaline compound is ammonium hydroxide and the source of sulfide ion is ammonium sulfide.

7. The process of claim 5 wherein the pH is adjusted to from about 6 to about 7.

8. The process of claim 5 wherein the manganese ore comprises an admixture of manganese oxides in the manganese dioxide and manganous oxide states.

9. The process of claim 8 wherein the aqueous solution of ferrous chloride contains up to about 10% by weight of hydrochloric acid on an HCl basis.

10. The process of claim 5 wherein iron hydroxide is separated from the neutralized mass prior to the addition of a source of sulfide ion thereto.

11. A process for providing an aqueous solution of manganous chloride essentially free from heavy metal contaminants, comprising:

(I) digesting a manganese ore containing heavy metal compounds with spent hydrochloric acid pickle liquor containing up to about 10% by weight of hydrochloric acid on an HCl basis and ferrous chloride in an amount on a molar basis at least about equal to the manganese content of said ore to form a digested mixture;
  (II) adding ammonium hydroxide to the digested mixture to bring the pH thereof to from about 5.5 to about 7 to form a neutralized mass containing iron hydroxide;

(III) adding ammonium sulfide to said neutralized mass in an amount at least about equal on a molar basis to the heavy content of said manganese ore to precipitate essentially all the heavy metal content as sulfides, and (IV) filtering to provide said manganese chloride solution.

12. The process of claim 11 wherein the manganese ore comprises an admixture of manganese oxides in the manganese dioxide and manganous oxide states.

13. The process of claim 11 wherein the pH of the spent hydrochloric acid pickle liquor is adjusted to a value from about 2 to about 3 prior to digesting said mananese ore.

14. A process for providing an aqueous solution of manganous chloride essentially free from heavy metal contaminants, comprising:

(I) neutralizing spent hydrochloric acid pickle liquor containing ferrous chloride and up to about 10 weight percent of hydrochloric acid on an HCl basis to a pH of from about 2 to about 3 to form a digesting solution;

(II) digesting manganese ore containing heavy metal compounds with said digesting solution at elevated temperatures to form a digested mixture, the proportions of said digesting solution and ore being selected such that the ferrous chloride content is on a molar basis at least about equal to the manganese content of said ore;

(III) adding ammonium hydroxide to said digested mixture to bring the pH thereof to from about 5.5 to about 7 to form a neutralized mass containing precipitated iron hydroxide;

(IV) adding ammonium sulfide to said neutralized mass in an amount at least equal on a molar basis to the heavy metal content of said manganese ore, to precipitate out essentially all the heavy metal content as sulfides and (V) filtering to provide said manganous chloride solution.

15. The process of claim 14 wherein iron hydroxide is separated from the neutralized mass prior to the addition of sulfide ion thereto.

References Cited

UNITED STATES PATENTS

| | | | |
|---|---|---|---|
| 2,070,496 | 2/1937 | Sweet et al. | 23—145X |
| 2,044,799 | 6/1936 | MacCarthy | 23—87X |
| 2,747,965 | 5/1956 | Daugherty | 23—87X |
| 2,877,110 | 3/1959 | Cooper et al. | 23—87X |

EDWARD STERN, Primary Examiner

U.S. Cl. X.R.

23—145R, 200R